United States Patent
Yoshida et al.

(10) Patent No.: US 9,541,400 B2
(45) Date of Patent: Jan. 10, 2017

(54) FIBER OPTIC GYROSCOPE SENSING COIL AND METHOD OF FABRICATING THE SAME

(75) Inventors: Toyoori Yoshida, Tokyo (JP); Takayuki Tamaki, Tokyo (JP); Akihiko Kojima, Tokyo (JP)

(73) Assignee: TOKYO KEIKI INC., Tokyo (JP)

( * ) Notice: Subject to any disclaimer, the term of this patent is extended or adjusted under 35 U.S.C. 154(b) by 76 days.

(21) Appl. No.: 14/407,052

(22) PCT Filed: Jun. 12, 2012

(86) PCT No.: PCT/JP2012/064981
§ 371 (c)(1),
(2), (4) Date: Jan. 8, 2015

(87) PCT Pub. No.: WO2013/186852
PCT Pub. Date: Dec. 19, 2013

(65) Prior Publication Data
US 2015/0185014 A1 Jul. 2, 2015

(51) Int. Cl.
*G01C 19/72* (2006.01)
*G01C 25/00* (2006.01)

(52) U.S. Cl.
CPC ............. *G01C 19/722* (2013.01); *G01C 25/00* (2013.01); *Y10T 29/49885* (2015.01)

(58) Field of Classification Search
CPC ...... G01C 19/00; G01C 19/721; G01C 19/722
(Continued)

(56) References Cited

U.S. PATENT DOCUMENTS 4,699,451 A * 10/1987 Mohr ................ G01C 19/722
242/167
5,767,509 A   6/1998 Cordova et al.
(Continued)

FOREIGN PATENT DOCUMENTS

EP          1063542 A1   12/2000
JP      H 02-212712 A     8/1990
(Continued)

OTHER PUBLICATIONS

Extended European Search Report dated Jan. 14, 2016.
International Search Report (ISR) (PCT FORM PCT/ISA/210), in PCT/JP2012/064981, dated Jul. 10, 2012.

*Primary Examiner* — Jonathan Hansen
(74) *Attorney, Agent, or Firm* — McGinn IP Law Group, PLLC.

(57) ABSTRACT

A fiber optic gyroscope sensing coil, with which winding process of optical fiber may be simplified, crosstalk due to winding deficiencies may be reduced, and temperature sensitivity of gyroscope may be reduced.
A coil body 13 includes two potted coils 12 having respective windings of optical fiber which are wound in an aligned winding configuration while the same tension is applied to optical fiber and at the same feed speed of optical fiber between the two potted coils and encapsulated within a potting material 16. The potted coils 12 are united together to form the coil body 13 by adhering the potted coils with each other at respective one side faces 12b thereof by using the potting material 16 as adhesive, and the tip ends of respective first fiber end sections 12c of optical fiber 14 of the potted coils 12, which are guided out from respective outermost layers of the windings of the potted coils 12, are connected with each other by fusing to form a continuous length of optical fiber of the coil body 13 wound in one direction.

20 Claims, 11 Drawing Sheets

(58) Field of Classification Search
USPC .......................................................... 356/465
See application file for complete search history.

(56) References Cited

U.S. PATENT DOCUMENTS

| | | | |
|---|---|---|---|
| 5,818,590 A | 10/1998 | Patterson | |
| 5,896,199 A * | 4/1999 | Mark | .................... G01C 19/722 |
| | | | 356/465 |
| 2005/0062977 A1 | 3/2005 | Lange et al. | |
| 2008/0130010 A1 * | 6/2008 | Williams | ............... B65H 54/10 |
| | | | 356/465 |

FOREIGN PATENT DOCUMENTS

| | | |
|---|---|---|
| JP | H 04-198903 A | 7/1992 |
| JP | 5-273415 A | 10/1993 |
| JP | H 09-53945 A | 2/1997 |
| JP | 2708370 B2 | 2/1998 |
| JP | 10-206172 A | 8/1998 |
| JP | 11-513126 A | 11/1999 |
| JP | 3002095 | 1/2000 |
| JP | 2002-214452 A | 7/2002 |
| JP | 2003-107250 A | 4/2003 |
| JP | 2007-506980 A | 3/2007 |
| JP | 2011-89908 A | 5/2011 |
| WO | WO 98/04884 A2 | 2/1998 |
| WO | WO 00/41011 A1 | 7/2000 |

* cited by examiner (a)

(b)

FIBER OPTIC GYROSCOPE SENSING COIL AND METHOD OF FABRICATING THE SAME

TECHNICAL FIELD

The present invention relates to an optical fiber gyroscope sensing coil having improved environmental resistance and being easy to fabricate, as well as to a method of fabricating the same.

BACKGROUND OF THE INVENTION

Fiber optic gyroscope sensing coils have an intrinsic problem in that they are sensitive to environmental factors such as temperature and vibration, or in other words, they have relatively poor environmental resistance.

For example, when a fiber optic gyroscope sensing coil is subject to a temperature variation, clockwise and counter-clockwise light beams propagating through the sensing coil may experience the effect of the temperature variation at different timings, which may induce phase shifts other than the Sagnac phase shifts in the light beams. The phase error due to the effect of a temperature variation is induced by the Shupe effect and called "Shupe error."

In order to reduce the Shupe error, there have been proposed various methods of winding optical fiber onto a spool to form a sensing coil.

Among typical winding methods, dipolar and quadrupole winding methods are well known in the art. FIGS. 12(a) and (b) show the sensing coils formed by these methods, respectively. Both of these methods are categorized in a symmetrical winding method, in which a length of optical fiber is wound onto a coil spool such that each pair of fiber sections of the optical fiber, which are equidistant in opposite directions from the midpoint of the optical fiber, are beside or nearly beside each other on the coil spool.

More particularly, a length of optical fiber is pre-wound onto a first and a second supply spool and the midpoint of the fiber is located. The midpoint of the fiber is positioned onto the central core of the coil spool, and the fiber on the first supply spool is off-wound therefrom and wound onto the coil spool in clockwise direction to form a first (single or double) layer of turns. Then, the first supply spool is swapped with the second supply spool, and the fiber on the second supply spool is off-wound therefrom and wound onto the coil spool in counter-clockwise direction to form a second (single or double) layer of turns on the first layer.

In the bipolar winding method, this process is repeated while the two supply spools are swapped for every layer, so that clockwise and counter-clockwise single layers (shown by white circles and dark circles, respectively, in FIG. 12(a)) are alternately formed one on the other on the coil spool. In the quadrupolar winding method, this process is repeated while the two supply spools are swapped for every two layers, so that clockwise and counter-clockwise double layers (shown by white circles and dark circles, respectively, in FIG. 12(b)) are alternately formed one on the other on the coil spool.

The symmetrical winding method is intended to have sensing coils in which each pair of fiber sections, which are equidistant in opposite directions from the midpoint of the fiber, would experience as similar temperature variations as possible to each other, so that any phase shifts induced by a temperature variation in the clockwise and counter-clockwise light beams would be nearly the same and cancel out each other so as to maintain reciprocity of light propagation.

There is, however, a problem with the coils wound in symmetrical winding configurations. Since each pair of fiber sections which are equidistant in opposite directions from the midpoint of the fiber are placed in different layers from each other, the respective phase shifts induced by a temperature variation in the clockwise and counter-clockwise propagating light beams, respectively, cannot completely cancel out each other unless the temperature variation is uniform among the layers.

In order to address this problem, various coil winding methods have been proposed so far. FIG. 12(c) shows a sensing coil formed by using either of coil winding methods proposed by Patent Publication No. 1 (Japanese patent application publication No. Hei-2-212,712 (1990-212,712)) and Patent Publication No 2 (Japanese patent application publication No. Hei-4-198,903 (1992-198,903)).

In the coil winding method proposed by Patent Publication No. 1, the winding of a length of optical fiber onto a coil spool begins from the midpoint of the fiber and two halves of the fiber are wound in opposite (i.e., clockwise and counter-clockwise) directions in a symmetrical manner, such that (i) clockwise and counter-clockwise layers (shown by white and dark circles, respectively, in FIG. 12(c)) are formed in opposite sides of the midplane of the spool, and (ii) each pair of fiber sections, which are equidistant in opposite directions from the midpoint of the fiber, are placed (i) in corresponding layers which have opposite winding directions and lie at the same layer level and (ii) at positions equidistant from the midplane of the coil spool. The above also applies to the coil winding method proposed by Patent Publication No. 2.

More particularly, a length of optical fiber is pre-wound onto a first and a second supply spool and the midpoint of the fiber is located. The midpoint of the fiber is positioned onto the core of the coil spool, and the fiber on the first and second supply spools is off-wound therefrom and wound onto the coil spool while the spools are swapped with each other, as with the symmetrical winding method.

Patent Publication No. 3 (Japanese patent application publication No. Hei-9-053,945 (1997-053,945)) proposes a coil winding method, in which a length of optical fiber is pre-wound onto a first and a second supply spool and the midpoint of the fiber is located. The method uses a coil spool having a central core with a pair of flanges, one of which has an exit port near the central core. The fiber section that contains the midpoint of the fiber is threaded through the exit port and guided out of the coil spool. The fiber is off-wound from the first and second supply spools and wound onto the coil spool while the supply spools are swapped with each other, as with the symmetrical winding method. After the winding is completed, the opposite ends of the fiber are connected with each other by fusing, and the fiber section threaded through the exit port and guided out of the spool is severed to form a pair of fiber end sections, which are used as the end sections of the winding of the coil.

Patent Publication No. 4 (The publication of Japanese patent No. 3,002,095) and Patent Publication No. 5 (The publication of Japanese patent No. 2,708,370) propose to encapsulate layers of turns of an optical fiber coil within a potting material in order to reduce the effect of vibration. The potting material preferably has a relatively high elastic modulus (i.e., a relatively high stiffness) for this purpose, while a relatively low elastic modulus is desirable in order to avoid thermo-mechanical stresses. Thus, Patent Publication No. 4 proposes the use of potting materials having elastic moduli in a range from 1,000 p.s.i. (7 MPa) to 20,000 p.s.i. (138 MPa). Patent Publication No. 5 proposes the use of silicone potting materials having glass transition temperatures below −55 degrees Celsius, and thus outside the operational temperature range of gyroscope sensing coils, in order to assure that no significant change in elastic modulus of the potting material will occur during normal gyroscope operation, as well as proposes the addition of carbon black as filler material into silicone potting materials in order to increase stiffness of the latter, as "bare" silicone materials typically have elastic moduli below the lower limit of the above mentioned elastic modulus range.

PRIOR ART DOCUMENTS

Patent Publications

Patent Publication No. 1: Japanese patent application publication No. Hei-2-212,712 (1990-212,712))
Patent Publication No. 2: Japanese patent application publication No. Hei-4-198,903 (1992-198,903)
Patent Publication No. 3: Japanese patent application publication No. Hei-9-053,945 (1997-053,945)
Patent Publication No. 4: The publication of Japanese patent No. 3,002,095
Patent Publication No. 5: The publication of Japanese patent No. 2,708,370

SUMMARY OF THE INVENTION

Problems to be Solved by the Invention

In the coil winding methods proposed by Patent Publication Nos. 1, 2, and 3, two supply spools are repetitively swapped with each other before the whole length of optical fiber for the sensing coil has been wound onto the coil spool. The swapping process of the supply spools is, however, a complicated process, so that it requires a highly sophisticated coil winding machine if carried out by machine in an automated manner, while it requires much labor and time if carried out by hand.

Further, in any of the prior art symmetric winding methods, clockwise and counter-clockwise layers are alternately formed one on another, so that jumps of optical fiber are produced in order to pass over one or two layers of optical fiber wound in the other winding direction (one layer is passed over with the bipolar winding, and two layers are passed over with the quadrupole winding) and cross-overs of optical fiber are produced thereby. The cross-overs tend to induce mechanical stresses in optical fiber, which may cause reflection and loss of the light propagating in the optical fiber as well as polarization crosstalk (where the light is polarized), resulting in the phase error induced in the light.

Regarding the optical fiber coils shown in Patent Publication No. 4 and 5, it is noted that either of the coils has its optical fiber wound in a simple aligned winding configuration, which raises a problem in that significant errors tend to be caused by temperature variations.

The present invention is achieved in view of the problems mentioned above. Accordingly, it is an object of the present invention to provide a fiber optic gyroscope sensing coil, with which winding process of optical fiber is simplified, fabrication of the sensing coil requires relatively little labor and time, crosstalk due to winding deficiencies is reduced, and the sensitivity of the sensing coil to temperature and vibration is reduced. It is another object of the present invention to provide a method of fabrication of such sensing coil.

Resolution

According to the present invention, the above object is achieved by a fiber optic gyroscope sensing coil, comprising a coil body comprising two potted coils having respective windings of optical fiber which are wound in an aligned winding configuration while the same tension is applied to optical fiber and at the same feed speed of optical fiber between the two potted coils and encapsulated within a potting material, wherein the potted coils are united together to form the coil body by adhering the potted coils with each other at respective one side faces thereof by using the potting material as adhesive, and the respective windings of the two potted coils have respective first fiber end sections connected with each other by fusing so as to form a continuous length of optical fiber of the coil body wound in one direction.

The respective windings of the two potted coils may have a symmetry with respect to a plane of the side faces of the potted coils at which the potted coils are adhered with each other.

The respective first fiber end sections of the windings of the two potted coils may be guided out from respective outermost layers of the windings of the two potted coils, and the windings of the two potted coils may have respective second fiber end sections which are guided out from respective innermost layers of the windings of the two potted coils and form two opposite fiber end sections of the winding of the sensing coil.

The coil body may be elastically supported at only one side face thereof by means of a thermal insulation spacer in cantilever manner.

The coil body may be contained within a multi-shell metallic casing comprising a plurality of shells one enveloped within another, wherein there may be gaps between the potted coils and the innermost one of the shells and between an inner one and the next outer one of the shells, and wherein the gaps may be so small that substantially no convection currents are created in the gaps.

The plurality of shells may include an inner shell and an outer shell, wherein the inner shell is made of a material having a thermal conductivity higher than that of the outer shell.

The potting material may comprise a soft adhesive of room temperature-curing-type.

The potting material may have an elastic modulus in a range from 0.1 MPa to 5 MPa at temperatures above its glass transition temperature, and in a range from 0.1 MPa to 3 GPa at temperatures below its glass transition temperature.

The potting material may have a glass transition temperature at room temperature.

The potting material may comprise a soft epoxy adhesive.

According to the present invention a method of fabricating fiber optic gyroscope sensing coil is provided, which comprises the steps of forming two potted coils each encapsulated within a potting material, wherein each of the two potted coils is formed by winding a length of optical fiber, which is applied with the potting material, onto a coil forming spool in a aligned winding configuration to form a winding and removing the winding from the coil forming spool after the potting material has cured; uniting the two potted coils together to form a coil body by adhering the potted coils at respective side faces thereof by using the potting material as adhesive, such that the windings of the potted coil in the coil body have a symmetry with respect to the plane of the side faces at which the potted coils are adhered with each other; and connecting respective first fiber end sections of the winding of the potted coils with each other by fusing so as to form a continuous length of optical fiber of the coil body wound in one direction.

The respective first fiber end sections of the windings of the two potted coils may be guided out from respective outermost layers of the windings of the two potted coils.

The first fiber end section of the winding of one of the two potted coils may have a first length between the outermost layer of the winding thereof and a point at which the first fiber end sections are connected with each other by fusing, and the first fiber end section of the winding of the other of the two potted coils may have a second length between the outermost layer the winding thereof and the point at which the first fiber end sections are connected with each other by fusing, wherein the first and second length may be different from each other.

Advantages Provided by the Invention

According to the present invention, two potted coils each having a winding of optical fiber wound in an aligned configuration and encapsulated within a potting material are formed, and then contacted and adhered with each other. By virtue of this, the coil winding process for fabricating the sensing coil is simplified because it requires no complicated steps unlike various prior art coil winding methods. In consequence of this, the coil winding process may be carried out by machine in an automated manner, as well as may be carried out by hand with reduced labor and cost. It also contributes to reduced occurrence of winding deficiencies. Further, each pair of fiber sections of the winding of the coil body, which are equidistant in opposite directions from the midpoint of the optical fiber, may be placed (i) in the respective layers of the windings of the two potted coils which are at the same layer level and (ii) at symmetric positions with respect to the midplane of the coil body (the midplane is the plane of the side faces of the two potted coils at which they are contacted and adhered with each other). With this arrangement, a symmetry in the temperature distribution in the coil body may be ensured, so that any phase shifts induced in the clockwise and counterclockwise light beams may be equalized and cancel out each other.

In addition, unlike the prior art bipolar and quadrupole windings, no jumps of optical fiber are produced in order to pass over one or two layers of optical fiber wound in the other winding direction and no cross-overs of optical fiber are produced thereby. Otherwise, the cross-overs would induce mechanical stresses in the optical fiber, which may cause reflection and loss of the light propagating in the optical fiber as well as polarization crosstalk (where the light is polarized), resulting in the phase error induced in the light. Thus, according to the present invention, all these undesirable effects may be reduced and suppressed, so that a highly precise fiber optic gyroscope may be provided.

EXEMPLARY MODE FOR CARRYING OUT THE INVENTION

Hereinafter, embodiments of the present invention will be described with reference to the accompanied drawings.

Figure 1:
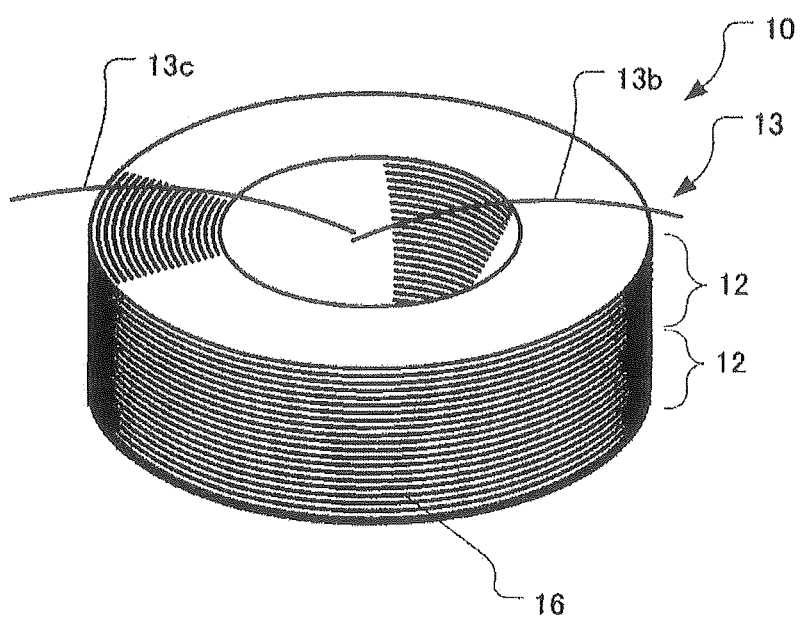
FIG. 1 is a perspective view of a coil body of a fiber optic gyroscope sensing coil according to the present invention.
Figure 2:
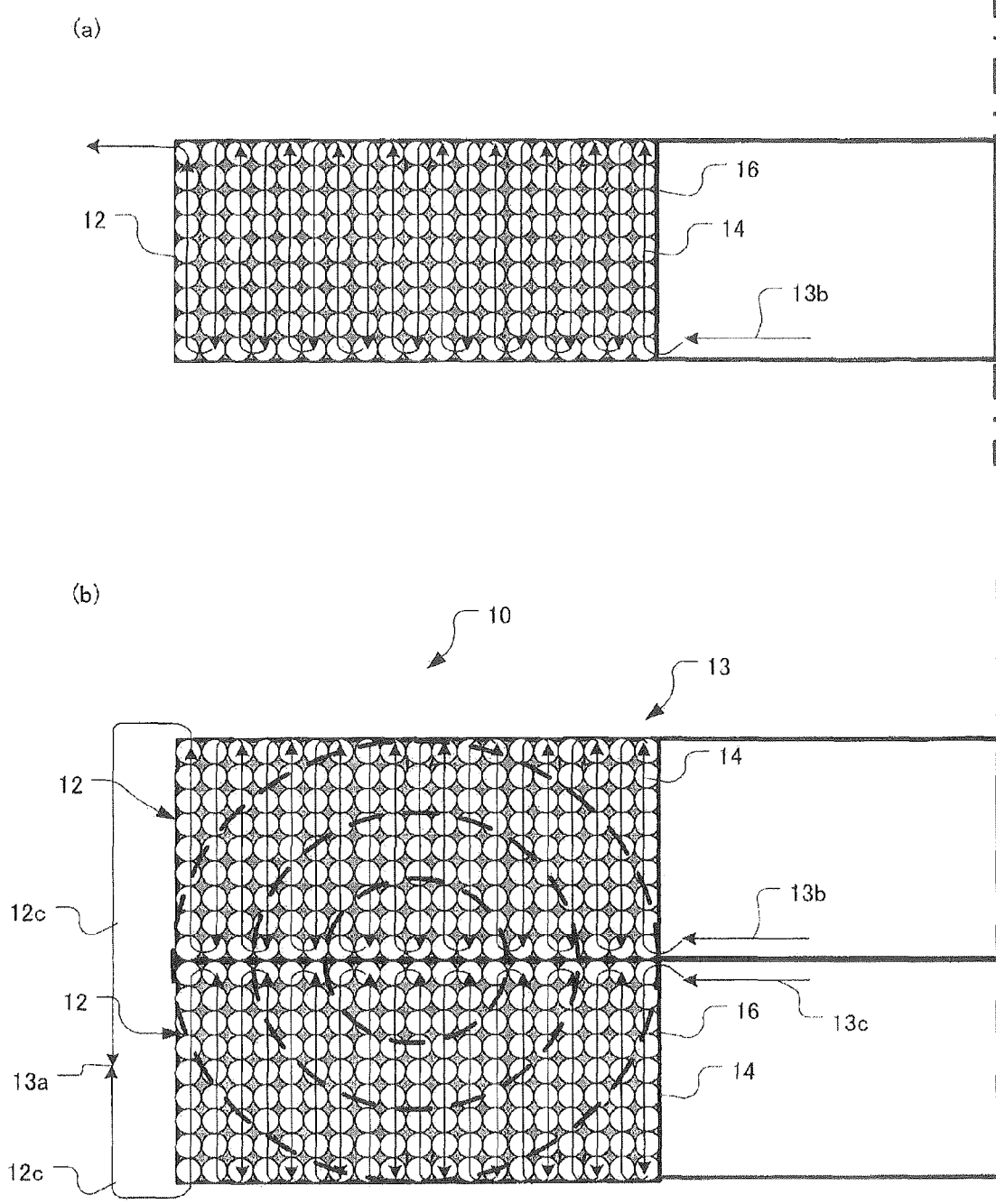
FIG. 2(a) is a sectional view of one of a potted coil for forming the coil body of FIG. 1.
FIG. 2(b) is a sectional view of one of the coil body of FIG. 1

FIGS. 1 and 2 show a coil body 13 of a fiber optic gyroscope sensing coil 10 according to the present invention.

The coil body 13 of the fiber optic gyroscope sensing coil 10 includes two potted coils 12.

The potted coils 12 (one of which is shown in FIG. 2) have respective windings of optical fiber which are wound in an aligned winding configuration while the same tension is applied to optical fiber and at the same feed speed of optical fiber between the two potted coils 12. The windings of the potted coils 12 are each encapsulated within a potting material 16 such that adjacent turns of the optical fiber 14 in each winding are adhered with each other by the potting material 16. The optical fiber 14 may be a single-mode optical fiber (SM fiber) or a polarization-maintaining optical fiber (PM fiber).

The potting material 16 is preferably a soft adhesive of room-temperature-curing type which has: a softness sufficient to assume flexibility; a hardness of about 50-80 Shore A; and an elastic modulus (Young's modulus) of less than 7 MPa at room temperature (say, 20-25 degrees Celsius), and preferably less than 5 MPa at room temperature. Further, such a soft adhesive preferably has: a glass transition temperature at room temperature (say, 20-25 degrees Celsius); and an elastic modulus (Young's modulus) in a range from 0.1 MPa to 5 MPa at temperatures above the glass transition temperature, and in a range from 0.1 MPa to 3 GPa at temperatures below the glass transition temperature. An example of the potting material 16 is a soft epoxy adhesive with a glass transition temperature of about 22 degrees Celsius and with an elastic modulus having a temperature characteristic curve shown in FIG. 10.

Figure 3:
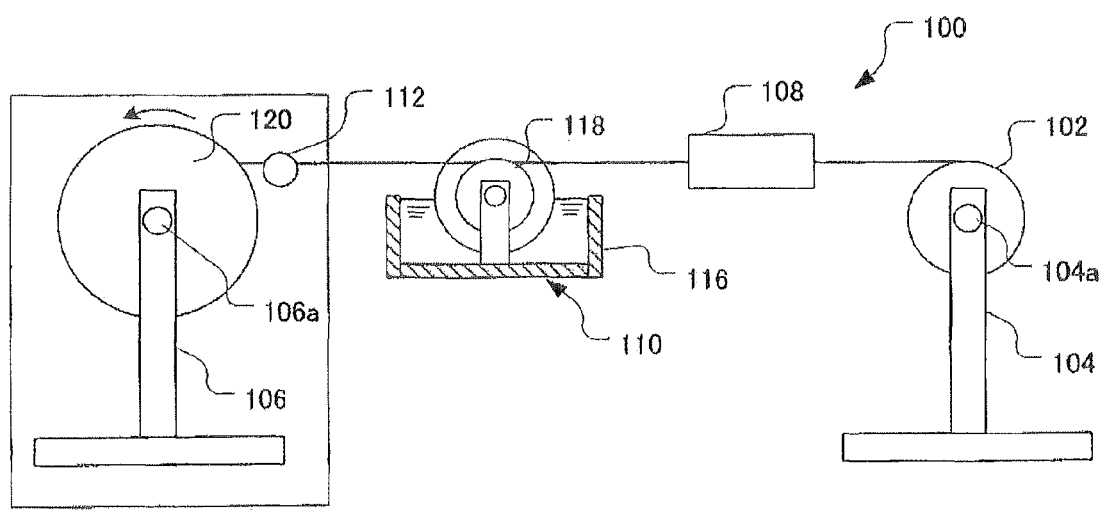
FIG. 3 is a schematic for illustrating a fabrication apparatus for fabricating the fiber optic gyroscope sensing coil according to the present invention.

The encapsulated, potted coils 12 may be fabricated by a fabrication apparatus 100 shown in FIG. 3. The fabrication apparatus 100 includes a fiber supply unit 104 having a supply spool support shaft 104a adapted to support a pair of supply spools 102 each of which has a length of optical fiber 14 pre-wound thereon and adapted to be set on the supply spool support shaft 104a, a coil forming unit 106 disposed to face to the fiber supply unit 104 and having a coil forming spindle 106a, a tensioner unit 108 disposed between the fiber supply unit 104 and the coil forming unit 106, a pair of adhesive applicator units 110 (only one is shown in FIG. 3) disposed between the tensioner unit 108 and the coil forming unit 106, and a pair of fiber guide units 112 (only one is shown in FIG. 3). The coil forming spindle 106a is driven to rotate by a driving unit (not shown).

Figure 4:
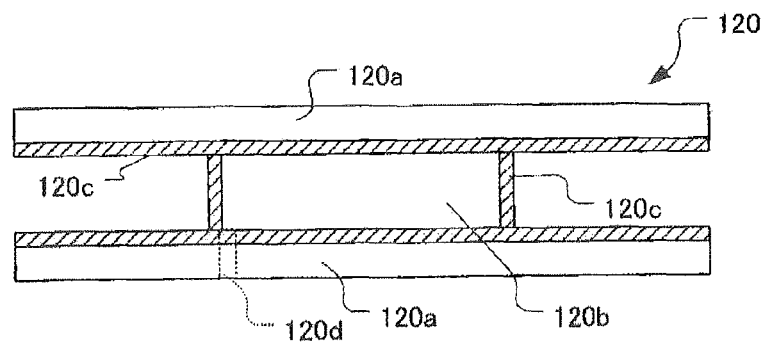
FIG. 4 is a side view of a coil forming spool used for fabrication of the fiber optic gyroscope sensing coil according to the present invention.

FIG. 4 shows a coil forming spool 120 adapted to be set on the coil forming spindle 106a of the coil forming unit 106. The coil forming spool 120 is preferably made of a suitable material having a good adhesive releasability and a good dimensional stability (such as, polytetrafluoroethylene.) As shown in FIG. 4, the coil forming spool 120 has a pair of flanges 120a, a central core 120b connecting the flanges 120a, and resin packing layers 120c coated on the inner surfaces of the flanges 120a and the outer surface of the central core 120b. Further, the coil forming spool 120 has an exit port 120d. A first fiber end section of a length of optical fiber 14 for the winding of the potted coil 12, from which the length of optical fiber 14 starts being wounded, is threaded through the exit port 120d and guided out of the coil forming spool 120. The exit port may be a through hole, a groove, or a cutout. The central core 120b is adapted to fit over the coil forming spindle 106a and is driven for rotation by the spindle 106a.

Each of the pair of adhesive applicator units 110 includes a reservoir tank 116 for the potting material 16, which is a liquid adhesive, and an applicator roll 118 supported for rotation and having its lower portion immersed in the potting material 16 in the reservoir tank 116.

Each of the pair of fiber guide units 112 includes a guide head which is movable for reciprocation in the direction parallel to the axes of the supply spool supporting shaft 104a and the coil forming spindle 106a.

In operation, two supply spools 102 are preferably set on the supply spool support shaft 104a of the supply unit 104. For each of the supply spools 102, one end of the length of optical fiber 14 pre-wound thereon is pulled out of the supply spool 102, and routed through the tensioner unit 108, and then through the adhesive applicator unit 110, and then into the coil forming unit 106, where the end of the fiber is threaded through the exit port 120d from inside to outside of the coil forming spool 120. Then, the coil forming spindle 106a is driven for rotation, while the guide head of the fiber guide unit 112 is driven for reciprocation in the direction parallel to the axes of the supply spool support shaft 104a and the coil forming spindle 106a. Thereby the optical fiber 14 is off-wound from the supply spool 102, is applied with the adhesive potting material 16 by the adhesive applicator unit 110, and is wound onto the central core 120b of the coil forming spool 120 in a tight aligned winding configuration (or solenoid-type winding configuration). More particularly, the optical fiber 14 is wound onto the coil forming spool 120 while being guided from near the first flange toward the second flange so as to form a first layer of turns on the central core 120b, and then continues to be wound on the coil forming spool 120 while being guided back from near the second flange toward the first flange so as to form a second layer of turns on the first layer, and so on. The spindle 106a is rotated a predetermined number of turns to form a coil having a desired number of layers.

Figure 5:
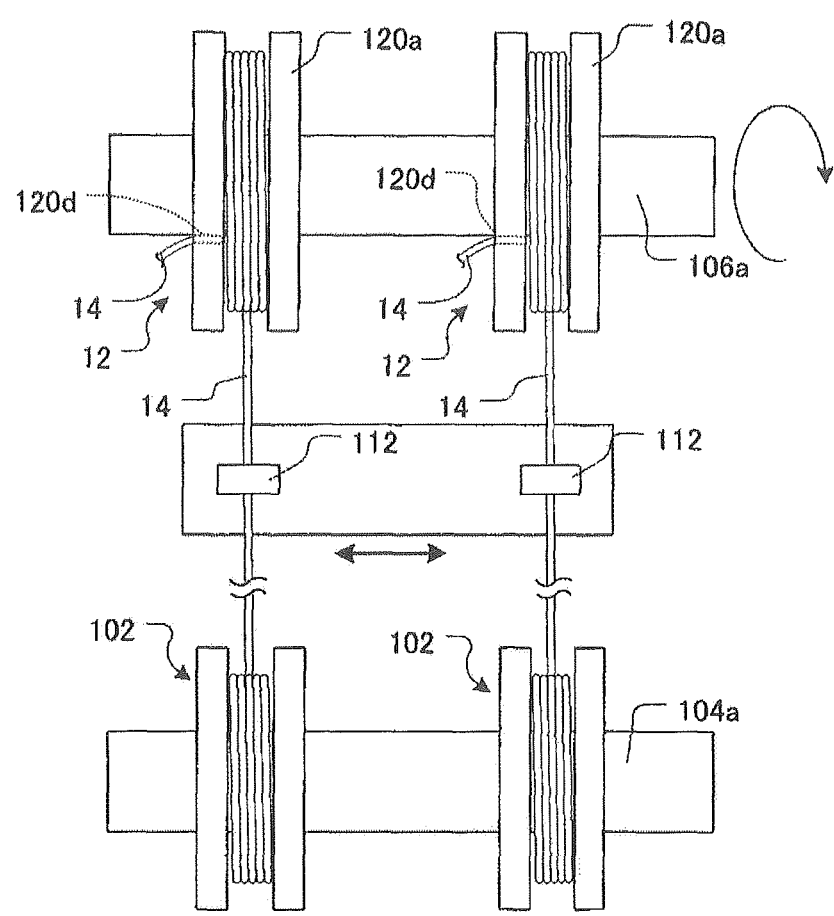
FIG. 5 is a schematic for illustrating a step in a process of fabrication of the fiber optic gyroscope sensing coil according to the present invention.

As shown in FIG. 5, it is preferable that (i) the two supply spools 102 are set side by side on the supply spool support shaft 104a, (ii) the two coil forming spools 120 are set side by side on the coil forming spindle 106a, (iii) the two adhesive applicator units 110 are disposed in parallel, and (iv) the coil forming spindle 106a is driven for rotation so as to form the two potted coils 12 simultaneously on the same spindle 106a. Further, with this simultaneous winding, it is preferable that (v) two lengths of optical fiber 14 are wound onto the two coil forming spools 120 while the same tension is applied to both the lengths of optical fiber 14 by the same tensioner unit 108. In this manner, the two potted coils 12 may be formed in an automated manner, in which the lengths of optical fiber forming the windings of the two potted coils 12 (i) are wound while the same tension is applied thereto, (ii) are wound at the same feed speed, (iii) have the same winding characteristics, (iv) have the same length, and (v) are wound in the same winding direction.

Figure 6:
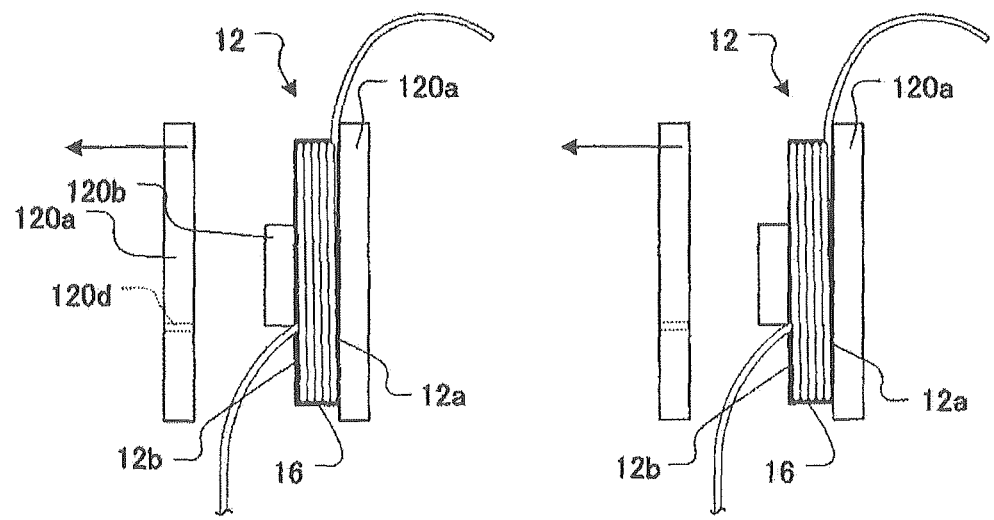
FIG. 6 is a schematic for illustrating another step, following the step of FIG. 5, in the process of fabrication of the fiber optic gyroscope sensing coil.

The windings thus wound are left to cure under room temperature. Then, as shown in FIG. 6, one of the flanges 120a is removed from the central core 120b of the coil forming spool 120, and the potted coil 12, which is encapsulated within a solid matrix of the potting material 16, is removed from the coil forming spool 102.

Figure 7:
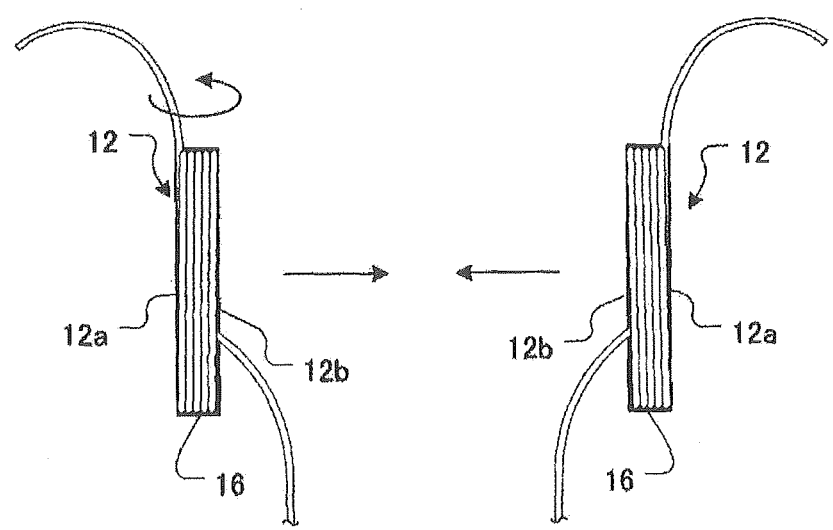
FIG. 7 is a schematic for illustrating a further step, following the step of FIG. 6, in the process of fabrication of the fiber optic gyroscope sensing coil.

Each encapsulated, potted coil 12 has opposite side faces 12a and 12b. One of the side faces (indicated by 12b) of one potted coil 12 and one of the side faces (indicated by 12b) of the other potted coil 12, which faced to the same direction when the potted coils 12 were on the respective coil forming spools 120 set on the same spindle 106a, are then contacted and adhered with each other by using the potting material 16 as adhesive and leaving the potted coils 12 at room temperature to cure the potting material 16 used as adhesive. In order to contact such side faces of the two potted coils 12 with each other, the relative orientation between the two potted coils 12 is inverted from that existed when they were on the respective coil forming spools set on the spindle 106a, as shown in FIG. 7. After the potting material 16 used as adhesive is cured, the two potted coils 12 are united together into one coil body 13. Because the relative orientation between the two potted coils 12 is inverted in the manner described above, the windings of the two potted coils 12 have a symmetry with respect to a plane of their side faces 12b at which the potted coils 12 are contacted and adhered with each other.

Figure 8:
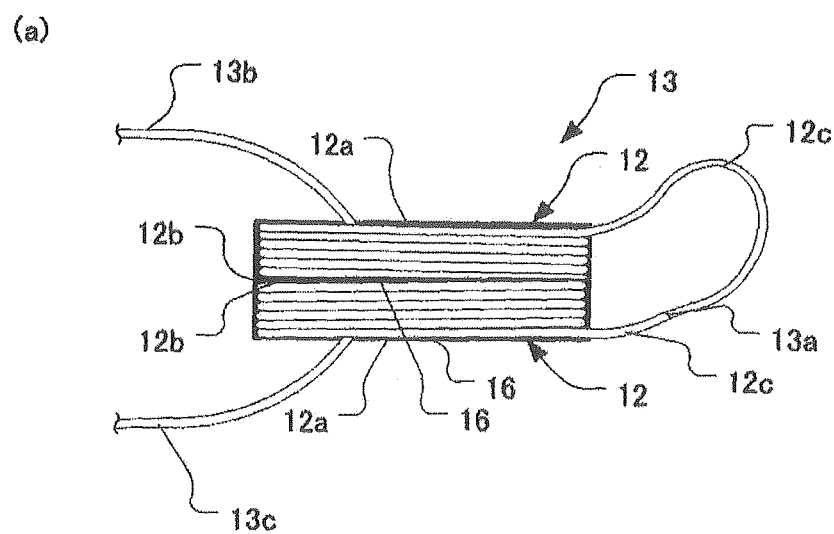
FIG. 8(a) is a side view of the coil body fabricated by the process of fabrication of the fiber optic gyroscope sensing coil and after the step of FIG. 7.
FIG. 8(b) is a top view of the coil body of FIG. 8(a).
Figure 8:
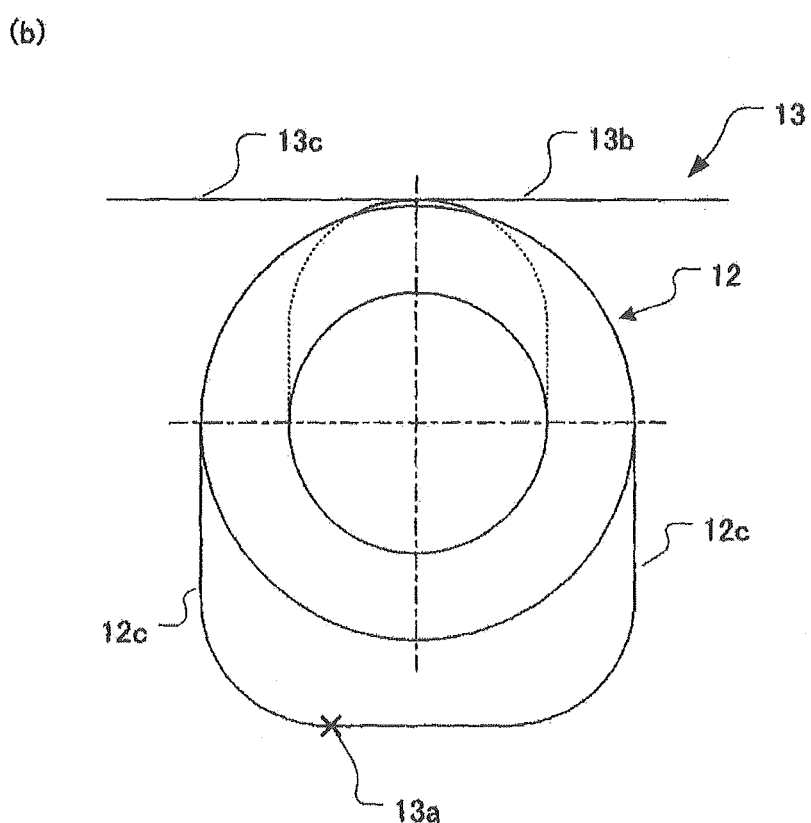

Then, the respective first fiber end sections of the windings of the two potted coils 12, which are guided out from the respective outermost layers of the windings, are connected with each other at their tip ends by fusing, as shown in FIG. 8. The respective first fiber end sections 12c of the windings of the two potted coils 12 have different lengths, and the difference in length is made longer than one half of the coherence length of the light propagating through the fiber, which depends on the characteristics of the light source, in order to avoid any spurious errors due to variation of reflection and/or crosstalk. Thus, the fusing point 13a is distant from the midpoint of the connected first fiber end sections 12c. Where the optical fiber 14 is a polarization maintaining fiber (PM fiber), the polarization axes at the respective first fiber end sections 12c have to be matched with each other when the tip ends of the first fiber end sections 12c are connected with each other by fusing.

The connected first fiber end sections 12c are preferably adhered to one side face 12a of one potted coil 12 by using the potting material 16 as adhesive, and left at room temperature to cure the adhesive 16. In this manner, the two potted coils 12 are adhered with each other and thereby united together to form the coil body 13 of the sensing coil 10. The respective first fiber end sections of the respective lengths of optical fiber for the windings of the two potted coils 12, from which the respective lengths of optical fiber started being wounded, and which are guided out from the respective innermost layers of the windings of the two potted coils 12, are used as the opposite fiber end sections of the winding of the coil body 13 for connection to an interferometer (not shown) of the fiber optic gyroscope.

Figure 9:
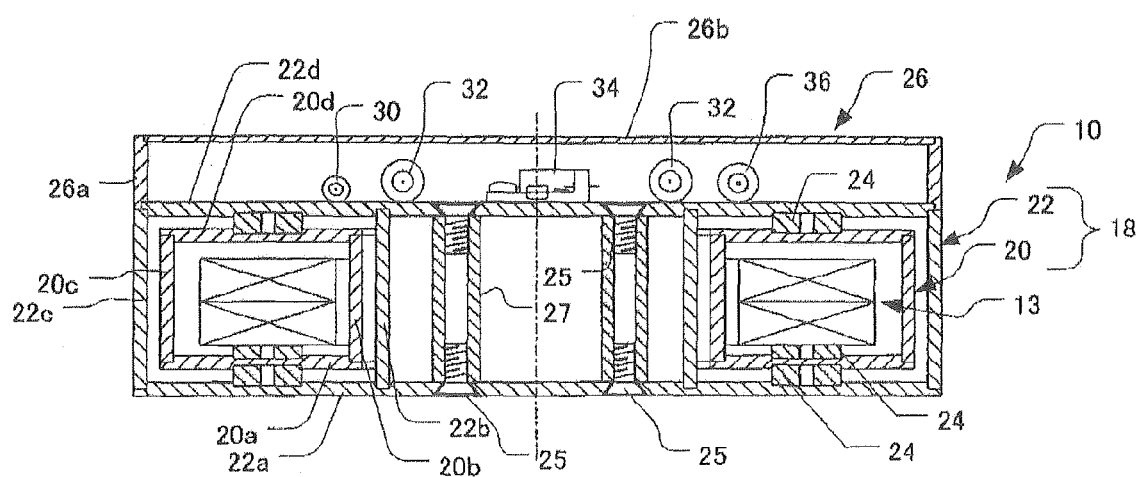
FIG. 9 is a sectional view of a fiber optic gyroscope sensing coil according to the present invention.

As shown in FIG. 9, the coil body 13 is preferably contained within a metallic casing 18. The metallic casing 18 is preferably a multi-shell metallic casing having at least two metallic shells one enveloped within another. The metallic casing 18 shown in FIG. 9 is a double-shell metallic casing having an inner shell 20 and an outer shell 22. The inner shell 20 is completely enveloped within the outer shell 22. Alternatively, a multi-shell metallic casing having three or more shells may be used in place of the double-shell metallic casing 18.

Both of the inner shell 20 and the outer shell 22 are of a donut shape and include a bottom wall 20a or 22a, an inner circumferential wall 20b or 22b, an outer circumferential wall 20c or 22c, and a top wall 20d or 22d.

The coil body 13 is firmly mounted on the bottom wall 20a of the inner shell 20 by means of at least three spacers 24, which are made of a thermal insulation material and disposed on the bottom of the coil body 13 circumferentially at constant angular intervals.

The thermal insulation material of the spacers 24 preferably has a linear thermal expansion coefficient nearly equal to that of the potting material 16, a hardness higher than that of the potting material 16 and an elastic modulus higher than that of the potting material 16. For example, the thermal insulation material may be a synthetic resin and/or ceramic material, and more particularly, a glass-epoxy material may be advantageously used. The spacers 24 are firmly connected with the coil body 13 as well as with the bottom wall of the inner shell 20, by preferably using the potting material 16 as adhesive.

The coil body 13 is connected at only one side face thereof with the bottom wall 20a of the inner shell 20, and thus supported in cantilever manner. There is a small gap left between the coil body 13 and each of the surfaces of the top wall 20d, the inner circumferential wall 20b and the outer circumferential wall 20c, so that the coil body 13 is free from any constraint by the inner shell 20 even when it experiences thermal expansion or shrinkage, and thus substantially free from being subject to thermo-mechanical stresses. On the other hand, the gaps are so small that substantially no convection currents are created in the gaps, which contributes to a uniform temperature distribution within the inner shell 20. Further, the use of the spacers 24 made of a thermal insulation material prevents the direct heat transfer from the inner shell 20 to the coil body 13, which contributes to a uniform temperature distribution in the coil body 13.

The inner shell 20 is firmly connected to the bottom wall 22a and the top wall 22d of the outer shell 22 by means of at least three bottom and three top spacers 24, which are made of a thermal insulation material and disposed on the bottom wall 20a and the top wall 20d of the inner shell 20, respectively, circumferentially at constant angular intervals. Thus, the inner shell 20 and the outer shell 22 are firmly connected at both the top and bottom walls. The bottom wall 22a and the top wall 22d are connected with each other by means of spacers 27 and screws 25, with a predetermined spacing being kept between the walls 22a and 22d by the spacers 27.

The inner shell 20 and the outer shell 22 may be made of the same metallic material or of different metallic materials from each other. In the latter case, the inner shell 20 is preferably made of a metallic material having a thermal conductivity higher than that of the outer shell 22, or in other words, the outer shell 22 preferably provide a thermal insulation higher than that of the inner shell 20. With such a combination of the metallic materials of the inner and outer shells, the outer shell 22 advantageously prevents any environmental thermal disturbance from affecting the interior of the metallic casing 18 while the inner shell 20 advantageously reduces temperature gradient inside itself so as to contribute to a more uniform temperature distribution therein.

The top wall 20d of the inner shell 20 and the top wall 22d of the outer shell 22 have respective cutouts (not shown), through which the fiber end sections 13b and 13c of the winding of the coil body 13 are passed to exit the shells. The cutouts with the fiber end sections of the optical fiber passing therethrough is preferably sealed with a suitable metallic adhesive tape, such as an aluminum adhesive tape having a good thermal conductivity.

The metallic casing 18 has an optics container chamber 26 at the top thereof. The optics container chamber 26 includes an outer circumferential wall 26a and a top wall 26b, which are formed of the same metallic material as the outer shell 22 of the metallic casing 18. The top wall 22d of the outer shell 22 serves as a bottom wall of the optics container chamber 26. Alternatively, such an optics container chamber 26 may be formed at the bottom of the metallic casing 18, instead of being formed at the top thereof.

Within the optics container chamber 26, there are disposed optics for the optical gyroscope, including optical couplers 30, depolarizers 32, an integrated optic chip (IOC) 34, a polarizer 36 and others. The opposite fiber end sections 13b and 13c of the optical fiber of the coil body 13, guided out from the innermost layer of the winding of the coil body 13 and through the cutouts of the inner and outer shells, are connected with the related optics. Where the optical fiber 14 is a single mode fiber (SM fiber), the depolarizer 32 is needed for suppressing the effect of variation of polarization. The depolarizer 32 may be of a crystal type or of an optical fiber type. Where a depolarizer of an optical fiber type is used, it may be formed integral with the coil body 13, instead of being disposed in the optics container chamber 26.

The fiber optic gyroscope sensing coil 10 also has a temperature sensor (not shown) disposed within the inner shell 20 for measuring the temperature of the coil body 13.

As described above, the midpoint of the winding of the coil body 13 is the midpoint of the connected first fiber end sections 12c of the windings of the two potted coils 12 (the midpoint is distant from the fusing point 13a, as described). Thus, each pair of fiber sections of the winding of the coil body 13, which are equidistant in opposite directions from the midpoint of the optical fiber, are placed (i) in corresponding layers of the windings of the two potted coils 12 which lie at the same layer level, and (ii) at positions equidistant from the midplane of the coil body 13 (the midplane is the plane of the side faces of the two potted coils 12 at which they are contacted and adhered with each other). Thus, it is well expected that each pair of such fiber sections experience the same temperature variation when the heat flow in the coil body 13 has a symmetry. Accordingly, a symmetry in the temperature distribution in the coil body 13 is ensured.

More particularly, the symmetry in the temperature distribution in the coil body 13 is ensured by virtue of the arrangement that the respective side faces of the two potted coils 12, at which the later are contacted and adhered with each other, lie in the midplane of the coil body 13. For example, the symmetry can be ensured by forming the coil body 13 such that it will produce a substantially concentric temperature distribution as indicated by the broken lines in FIG. 2(b) whenever subjected to an environmental temperature change. The symmetry in the temperature distribution in the coil body 13 contributes to the reduction of any residual Shupe error.

Since the potted coil 12 has its optical fiber wound in a simple, aligned winding configuration, the sensing coil of the present invention can be fabricated with such winding process that is much more simple than those used for fabricating sensing coils having their optical fiber wounded in prior art winding configurations. In addition, the use of an aligned winding configuration contributes to reduced occurrence of winding deficiencies as well. Further, unlike bipolar and quadrupole winding configurations, an aligned winding configuration does not produce jumps of optical fiber in order to pass-over the layers of the other winding direction, so that the sensing coil of the present invention is free from cross-overs of optical fiber, resulting in reduced occurrence of stress concentration in optical fiber. Thus, reflection and loss of the light propagating in optical fiber as well as polarization crosstalk (where the light is polarized), which may be often caused by stress concentrations, are minimized and thereby the phase error is suppressed.

It is well known that the fiber end sections of an optical fiber sensing coil have higher differential temperature sensitivity than any other fiber sections. Since the coil body 13 has the fiber end sections 13b and 13c, which are guided out from the innermost layers of the respective potted coils 12 and thus lie at such positions that are least exposed to the environmental temperature variations, the sensing coil 10 of the present invention may have a construction that is highly insensitive to the environmental temperature variations.

The fiber section that contains the fusing point 13a tends to be less reliable than any other fiber sections and may have a relatively high sensitivity to mechanical stresses. With the present invention, such fiber section may be placed at a position near the outermost layer, at which the fiber section may be free from any mechanical stresses, resulting in the improved reliability and stability of the sensing coil 10.

Further, by encapsulating the optical fiber 14 of the potted coil 12 within a relatively soft potting material 16, any undesirable effects of the thermal expansion and shrinkage on the optical fiber 14 may be mitigated, which contributes to the prevention of spike noise in bias temperature sensitivity.

Figure 10:
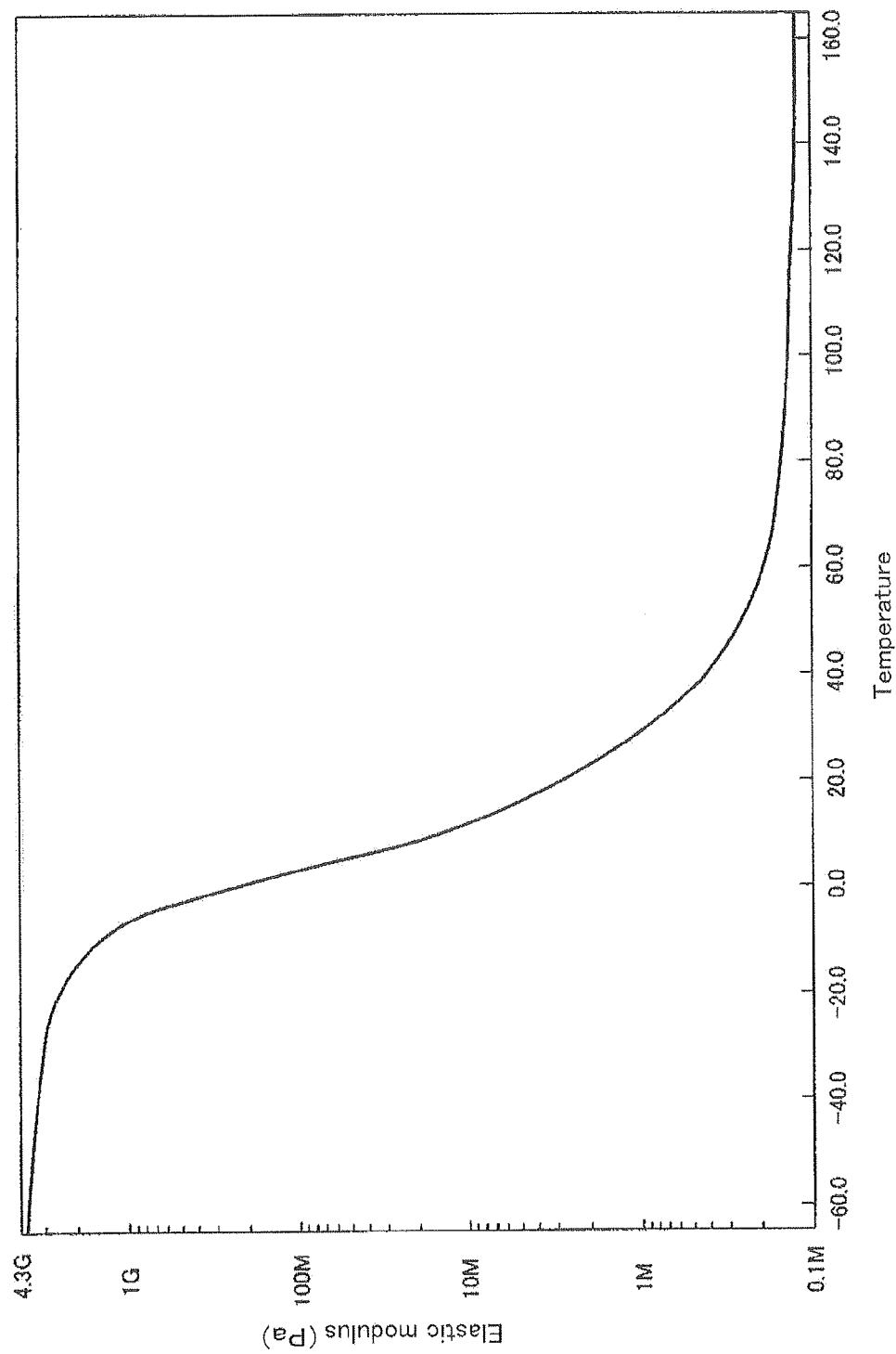
FIG. 10 is a chart showing an elastic-modulus-to-temperature characteristic curve of a preferred potting material.
Figure 11:
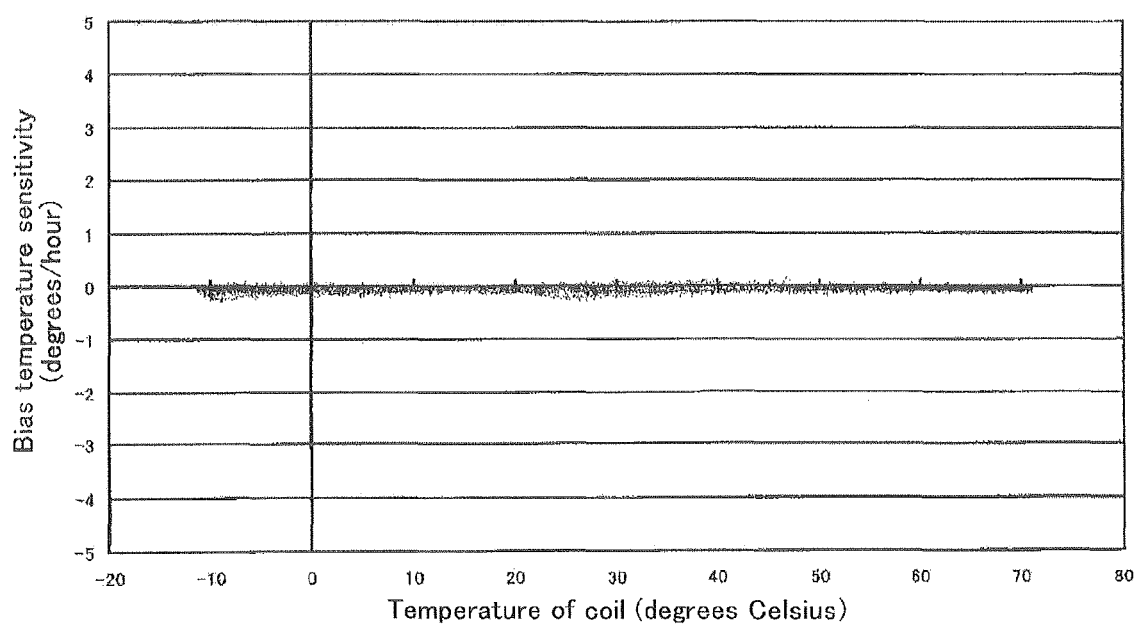
FIG. 11 is a chart showing a bias temperature sensitivity characteristic curve of a fiber optic gyroscope, after calibration, which includes an example of the sensing coil constructed in accordance with the present invention.
Figure 12:
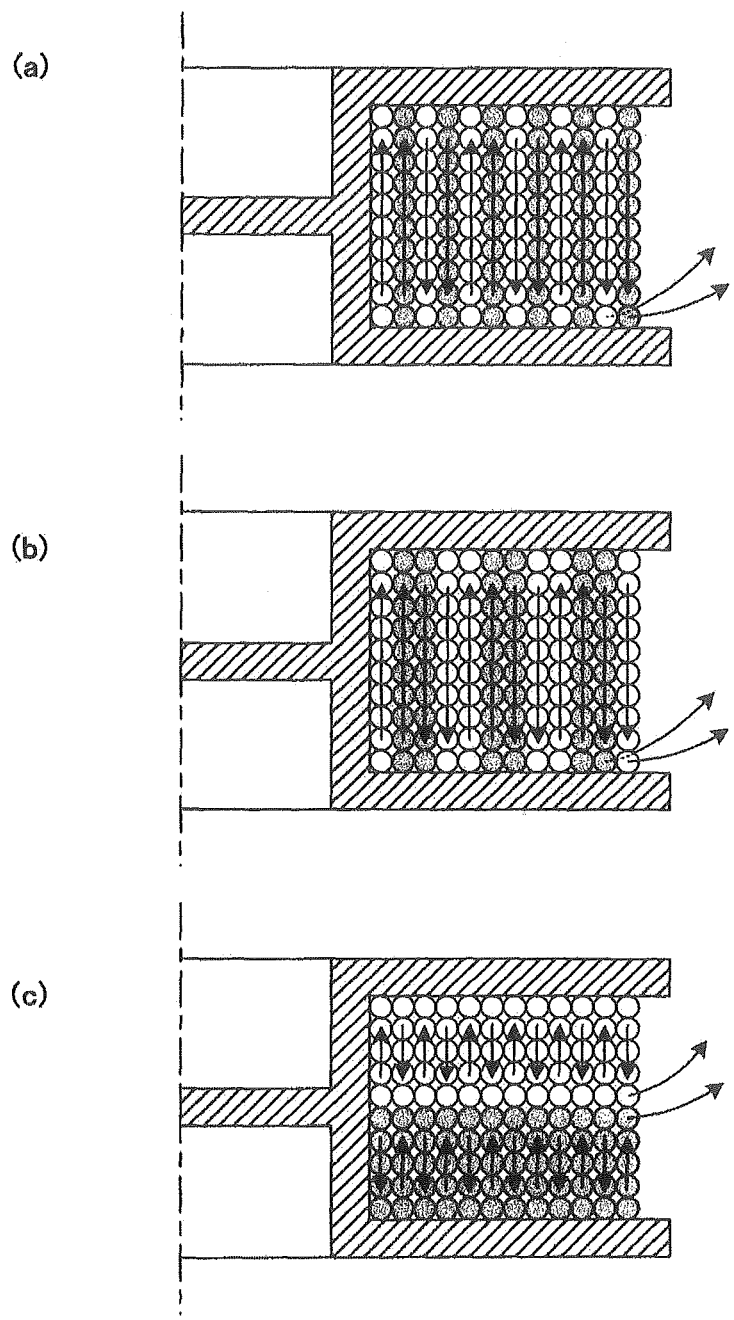
FIG. 12(a) is a sectional view of a fiber optic gyroscope sensing coil formed by a prior art optical fiber winding method.
FIG. 12(b) is sectional view of a fiber optic gyroscope sensing coil formed by another prior art optical fiber winding method.
FIG. 12(c) is sectional view of a fiber optic gyroscope sensing coil formed by a further prior art optical fiber winding method.

FIG. 11 is a chart showing a bias temperature sensitivity characteristic curve of a fiber optic gyroscope, after calibration, which includes an example of a sensing coil constructed in accordance with the present invention. The chart of FIG. 11 was obtained by testing the fiber optic gyroscope under the condition that the environmental temperature was varied from −20 degrees to +80 degrees and then back to −20 degrees Celsius at a rate of +/−0.75 degrees/minute. In particular, the sensing coil uses a relatively soft potting material having an elastic-module-to-temperature characteristic curve shown in FIG. 10. The fiber optic gyroscope achieved an excellent performance, in which no spike occurred in the bias temperature sensitivity, the bias instability was less than 0.018 degrees/hour (1σ), and the angle random walk was less than 0.0047 degrees/hour$^{1/2}$.

Figure 13:
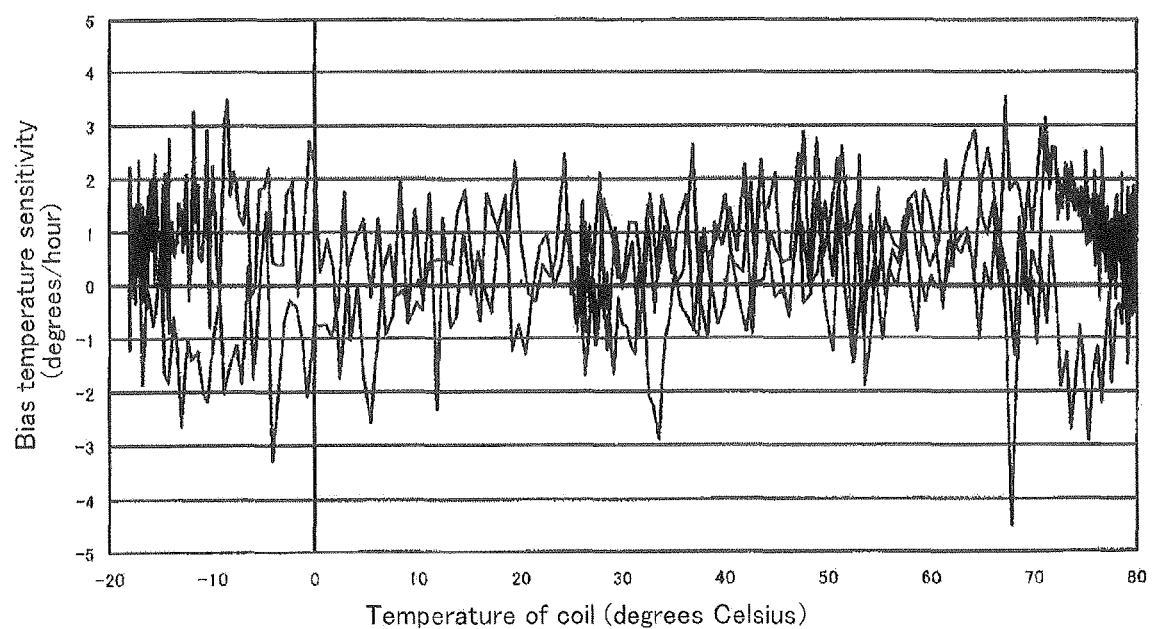
FIG. 13 is a chart similar to that of FIG. 11, however, for a sensing coil using a hard potting material.

FIG. 13 is a chart showing a bias temperature sensitivity characteristic curve of another fiber optic gyroscope, after calibration, which includes another example of a sensing coil constructed in accordance with the present invention. The chart of FIG. 13 was obtained by testing the fiber optic gyroscope under the same condition as above. However, the sensing coil of the fiber optic gyroscope uses a hard epoxy adhesive potting material having an elastic modulus of 3 GPa, which is substantially constant, independent of temperature. The fiber optic gyroscope produced many spikes in the bias temperature sensitivity when temperature was lowered, which is considered to have been caused by since the hard potting material can not sufficiently mitigate the effects of the thermal expansion (or more exactly thermal shrinkage) induced when temperature is lowered.

In contrast, the soft potting material, which realized the above mentioned gyroscope which was free from spikes in the bias temperature sensitivity, has an elastic modulus of 1.5 MPa at temperature of 30 degrees Celsius, which is much lower than that of the potting material proposed by Patent Publication Nos. 4 and 5 (i.e., from 7 to 138 MPa). Where a potting material of room-temperature-curing type is used, the thermo-mechanical stresses which may be induced in the optical fiber around room temperature are minimized, and the thermo-mechanical stresses experienced in the range above room temperature and those in the range below room temperature may be balanced. This contributes to reduced occurrence of the thermo-mechanical stresses, which is the major cause of the spike noise in the bias temperature sensitivity which may be induced when temperature is falling.

The coil body 13 is preferably supported within a metallic casing with no contact against any of metallic walls of the case, as well as elastically supported at only one side face thereof by means of thermal insulation spacers. By supporting the coil body 13 in this manner, the stability of bias temperature sensitivity is enhanced. In addition, it is more desirable to dispose the coil body 13 within a multi-shell metallic casing than within a single-shell metallic casing. By using a multi-shell metallic casing to contain the coil body 13 therein, the stability of bias temperature sensitivity is more enhanced.

Further, the fiber optic gyroscope including the sensing coil that uses the potting material having the elastic-modulus-to-temperature characteristic curve shown FIG. 10 was tested also for the vibration resistance property, under the condition that the gyroscope is subject to a vibration for 20 minutes, with a vibration acceleration of 2.0 G, and with vibration frequency swept from 0 to 100 Hz. The output of the gyroscope was measured while the vibration was applied to it and the results were used to estimate azimuthal error of the gyroscope, which was less than 0.35× (sec λ) degrees where λ stands for "latitude", low enough for actual use. Thus, it is proved that the fiber optic gyroscope sensing coil 10 according to the present invention is insensitive to the environmental factors such as temperature and vibration.

LIST OF REFERENCE NUMERALS

10 Fiber optic gyroscope sensing coil
12 Potted coil
12b Side face of potted coil
12c End section of optical fiber
13 Coil body 13a Fusing point of optical fiber
13b One fiber end section of optical fiber
13c The other fiber end section of optical fiber
14 Optical fiber
16 Potting material
18 Metallic casing
20 Inner shell
22 Outer shell
24 Spacer
120 Coil forming spool

What is claimed is:

1. A fiber optic gyroscope sensing coil, comprising:
a coil body comprising two potted coils including respective windings of an optical fiber which are wound in an aligned winding configuration while a same tension is applied to the optical fiber and at a same feed speed of optical fiber between the two potted coils and encapsulated within a potting material,
wherein the potted coils are united together to form the coil body by adhering the potted coils with each other at respective side faces thereof by using the potting material as adhesive, and the respective windings of the two potted coils include a respective first fiber end section connected with each other by fusing so as to form a continuous length of the optical fiber of the coil body wound in one direction,
wherein the respective side faces are perpendicular to a direction of a central axis of the potted coils, and
wherein the respective side surfaces of the potted coils are directly adhered to each other.

2. A fiber optic gyroscope sensing coil according to claim 1, wherein the respective windings of the two potted coils have a symmetry with respect to a plane of the respective side faces of the potted coils at which the potted coils are adhered with each other.

3. A fiber optic gyroscope sensing coil according to claim 1, wherein the respective first fiber end section of the windings of the two potted coils are guided out from respective outermost layers of the windings of the two potted coils, and the windings of the two potted coils includes respective second fiber end section which are guided out from respective innermost layers of the windings of the two potted coils and form two opposite fiber end sections of the winding of the sensing coil.

4. A fiber optic gyroscope sensing coal according to claim 1, wherein the coil body is elastically supported at only one side face thereof by a thermal insulation spacer in cantilever manner.

5. A fiber optic gyroscope sensing coil according to claim 1, wherein the coil body is contained within a multi-shell metallic casing comprising a plurality of shells one enveloped within another,
wherein there are gaps between the potted coils and an innermost of the shells and between an inner one and a next outer one of the shells, and
wherein the gaps are small that substantially no convention currents are created in the gaps.

6. A fiber optic gyroscope sensing coil according to claim 5, wherein the plurality of shells include an inner shell and an outer shell, and
wherein the inner shell comprises a material having a thermal conductivity higher than that of the outer shell.

7. A fiber optic gyroscope sensing coil according to claim 1, wherein the potting material comprises a soft adhesive of a room temperature curing type.

8. A fiber optic gyroscope sensing coil according to claim 1, wherein the potting material has an elastic modulus in a range from 0.1 MPa to 5 MPa at temperatures above its glass transition temperature, and in a range from 0.1 MPA to 3 GPa at temperatures below its glass transition temperature.

9. A fiber optic gyroscope sensing coil according to claim 8, wherein the potting material has a glass transition temperature at room temperature.

10. A fiber optic gyroscope sensing coil according to claim 1, wherein the potting material comprises a soft epoxy adhesive.

11. A method of fabricating a fiber optic gyroscope sensing coil, the method comprising:
forming two potted coils each encapsulated within a potting material, wherein each of the two potted coils is formed by winding a length of a optical fiber, which is applied with the potting material, onto a coil forming spool in an aligned winding configuration to form a winding and removing the winding from the coil forming spool after the potting material has cured;
uniting the two potted coils together to form a coil body by adhering the potted coils at respective side faces thereof by using the potting material as adhesive, such that the winding of the potted coil in the coil body have a symmetry with respect to a plane of the respective side faces at which the potted coils are adhered with each other; and
connecting respective first fiber end sections of the winding of the potted coils with each other by fusing so as to form a continuous length of optical fiber of the coil body wound in one direction,
wherein the respective side faces are perpendicular to a direction of a central axis of the potted coils, and
wherein the respective side surfaces of the potted coils are directly adhered to each other.

12. A method of fabricating the fiber optic gyroscope sensing coil according to claim 11, wherein the respective first fiber end sections of the windings of the two potted coils are guided out from respective outermost layers of the windings of the two potted coils.

13. A method of fabricating the fiber optic gyroscope sensing coil according to claim 12, wherein the first fiber end section of the winding of one of the two potted coils has a first length between the outermost layer of the winding thereof and a point at which the first fiber end sections are connected with each other by fusing, and the first fiber end section of the winding of the other of the two potted coils has a second length between the outermost layer the winding thereof and the point at which the first fiber end sections are connected with each other by fusing, and
wherein the first length and the second length are different from each other.

14. A fiber optic gyroscope sensing coil according to claim 1, wherein the potting material abuts each of the respective side surfaces of the potted coils.

15. A fiber optic gyroscope sensing coil according to claim 1, wherein, in a cross-sectional view, a longitudinal direction of an extension of each of the respective side surfaces of the potted coils is perpendicular to the direction of the central axis of the potted coils.

16. A fiber optic gyroscope sensing coil according to claim 1, wherein the potting material directly adheres each of the respective side surfaces of the potted coils.

17. A fiber optic gyroscope sensing coil according to claim 1, wherein, in a plan view, outer edges of each of the respective side surfaces of the potted coils overlap with outer edges of the potting material.

18. A method of fabricating the fiber optic gyroscope sensing coil according to claim 11, wherein the potting material abuts each of the respective side surfaces of the potted coils.

19. A method of fabricating the fiber optic gyroscope sensing coil according to claim 11, wherein the potting material directly adheres each of the respective side surfaces of the potted coils.

20. A method of fabricating the fiber optic gyroscope sensing coil according to claim 11, wherein, in a plan view, outer edges of each of the respective side surfaces of the potted coils overlap with outer edges of the potting material.

* * * * *